United States Patent
Flowers

(10) Patent No.: US 9,687,942 B2
(45) Date of Patent: Jun. 27, 2017

(54) PISTON WITH THERMALLY INSULATED CROWN

(71) Applicant: Mahle International GmbH, Stuttgart (DE)

(72) Inventor: William Flowers, Ann Arbor, MI (US)

(73) Assignee: Mahle International GmbH (DE)

( * ) Notice: Subject to any disclaimer, the term of this patent is extended or adjusted under 35 U.S.C. 154(b) by 242 days.

(21) Appl. No.: 14/474,906

(22) Filed: Sep. 2, 2014

(65) Prior Publication Data

US 2016/0059366 A1  Mar. 3, 2016

(51) Int. Cl.
  *F16J 1/04* (2006.01)
  *B23P 15/10* (2006.01)
  *F16J 1/00* (2006.01)
  *F02F 3/00* (2006.01)
  *F02F 3/02* (2006.01)

(52) U.S. Cl.
  CPC .............. *B23P 15/10* (2013.01); *F02F 3/003* (2013.01); *F16J 1/006* (2013.01); *F02F 3/02* (2013.01)

(58) Field of Classification Search
  CPC ...... F02F 3/003; F02F 2003/0061; F02F 3/20; F16J 1/006
  See application file for complete search history.

(56) References Cited

U.S. PATENT DOCUMENTS

| | | | | |
|---|---|---|---|---|
| 8,459,228 B2 * | 6/2013 | Bischofberger | ........ | F02F 3/003 29/888.043 |
| 2011/0030645 A1 | 2/2011 | Rebello et al. | | |
| 2013/0014723 A1 * | 1/2013 | Bucher | ..................... | F02F 3/22 29/888.043 |
| 2013/0068096 A1 * | 3/2013 | Gabriel | ..................... | F02F 3/22 92/231 |

* cited by examiner

*Primary Examiner* — Michael Leslie
(74) *Attorney, Agent, or Firm* — Fishman Stewart PLLC

(57) ABSTRACT

Exemplary pistons and methods are disclosed. A piston may include a piston body defining a piston axis, the body including radially inner and outer body mating surfaces, and an annular ring cooperating with the piston body to form a continuous upper combustion bowl surface having a radially inner portion defined by the piston body and a radially outer portion defined by the annular ring. The annular ring includes a radially inner ring mating surface and a radially outer ring mating surface, wherein at least one of the annular ring mating surfaces is joined with the corresponding piston body mating surface. The annular ring and piston body cooperate to define an annular gap therebetween configured to thermally insulate the piston body from the annular ring.

17 Claims, 5 Drawing Sheets

US 9,687,942 B2

PISTON WITH THERMALLY INSULATED CROWN

BACKGROUND

Internal combustion engine manufacturers are constantly seeking to increase power output and fuel efficiency of their products. One method of generally increasing efficiency and power is to reduce the oscillating mass of an engine, e.g., of the pistons, connecting rods, and other moving parts of the engine. Efforts to increase engine power and/or efficiency also may also result in an increase in pressure and/or temperature within the combustion chamber during operation.

Engines, and in particular the pistons of the engine, are therefore under increased stress as a result of these reductions in weight and increased pressures and temperatures associated with engine operation. Piston cooling is therefore increasingly important for withstanding the increased stress of such operational conditions over the life of the engine.

To reduce the operating temperatures of piston components, a cooling gallery may be provided about a perimeter of the piston. A coolant such as crankcase oil may be introduced to the cooling gallery, and may be distributed about the cooling gallery by the reciprocating motion of the piston, thereby reducing the operating temperature of the piston. In these approaches, conduction of heat downward away from the combustion chamber is emphasized by carrying away heat via the coolant.

At the same time, the cooling galleries may increase overall complexity of the piston assembly and manufacturing of the same. Moreover, cooling galleries require coolant to be circulated through the galleries during engine operation, in turn increasing the complexity of the engine. While cooling effects of fluid cooling galleries are significant, pumping losses associated with the need to circulate coolant through the cooling galleries are also significant.

Accordingly, there is a need for a piston that reduces fluid pumping losses, while also providing robust performance and resistance to high combustion temperatures.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of a method, which may include providing a piston body defining a piston axis, the body including radially inner and outer body mating surfaces. The method may further include assembling an annular ring with the piston body such that the piston body and crown ring cooperate to form a continuous upper combustion bowl surface having a radially inner portion defined by the piston body and a radially outer portion defined by the annular ring, where the annular ring including a radially inner ring mating surface and a radially outer ring mating surface. The method further includes joining the body to the annular ring along at least one of the radially inner and outer mating surfaces of the body and the annular ring. The annular ring and piston body may cooperate to define an annular gap therebetween configured to thermally insulate the piston body from the annular ring.

In some exemplary approaches, an engine may be operated using the piston. In these examples, the annular gap is left empty or otherwise filled with atmospheric air, thereby providing a thermal break between the combustion chamber and the piston body that generally inhibits or prevents heat transfer across the annular gap. The annular gap may thereby reduce conduction of heat across the annular gap during operation of the piston in an associated engine, e.g., as a primary path for heat transfer across the air gap will be convection. Accordingly, exemplary pistons may generally reduce conduction across the piston crown by forcing heat transfer to occur primarily through convection across the annular gap.

Exemplary pistons may include a piston body defining a piston axis, the body including radially inner and outer body mating surfaces, and an annular ring cooperating with the piston body to form a continuous upper combustion bowl surface having a radially inner portion defined by the piston body and a radially outer portion defined by the annular ring. The annular ring includes a radially inner ring mating surface and a radially outer ring mating surface, wherein at least one of the annular ring mating surfaces is joined with the corresponding piston body mating surface. The annular ring and piston body cooperate to define an annular gap therebetween configured to thermally insulate the piston body from the annular ring.

Figure 1A:
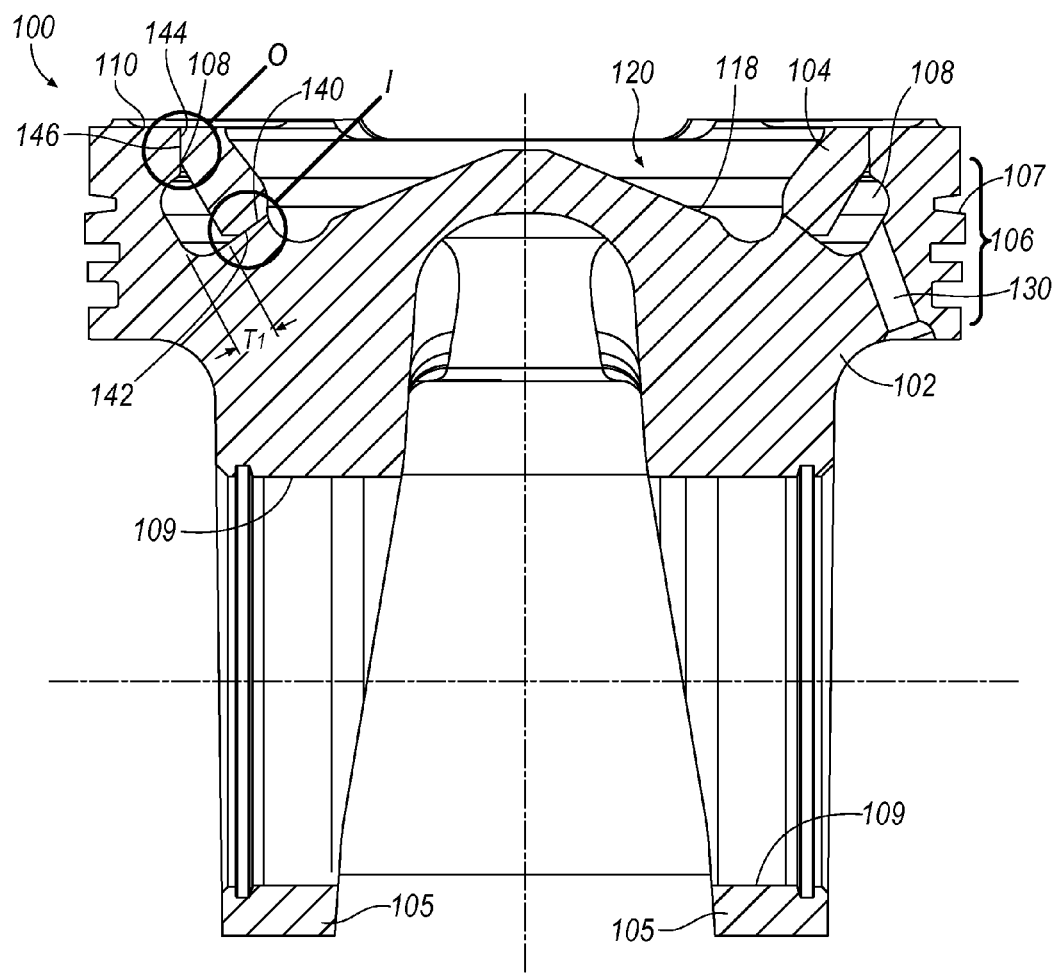
FIG. 1A is a partial section view of an exemplary piston assembly.
Figure 1B:
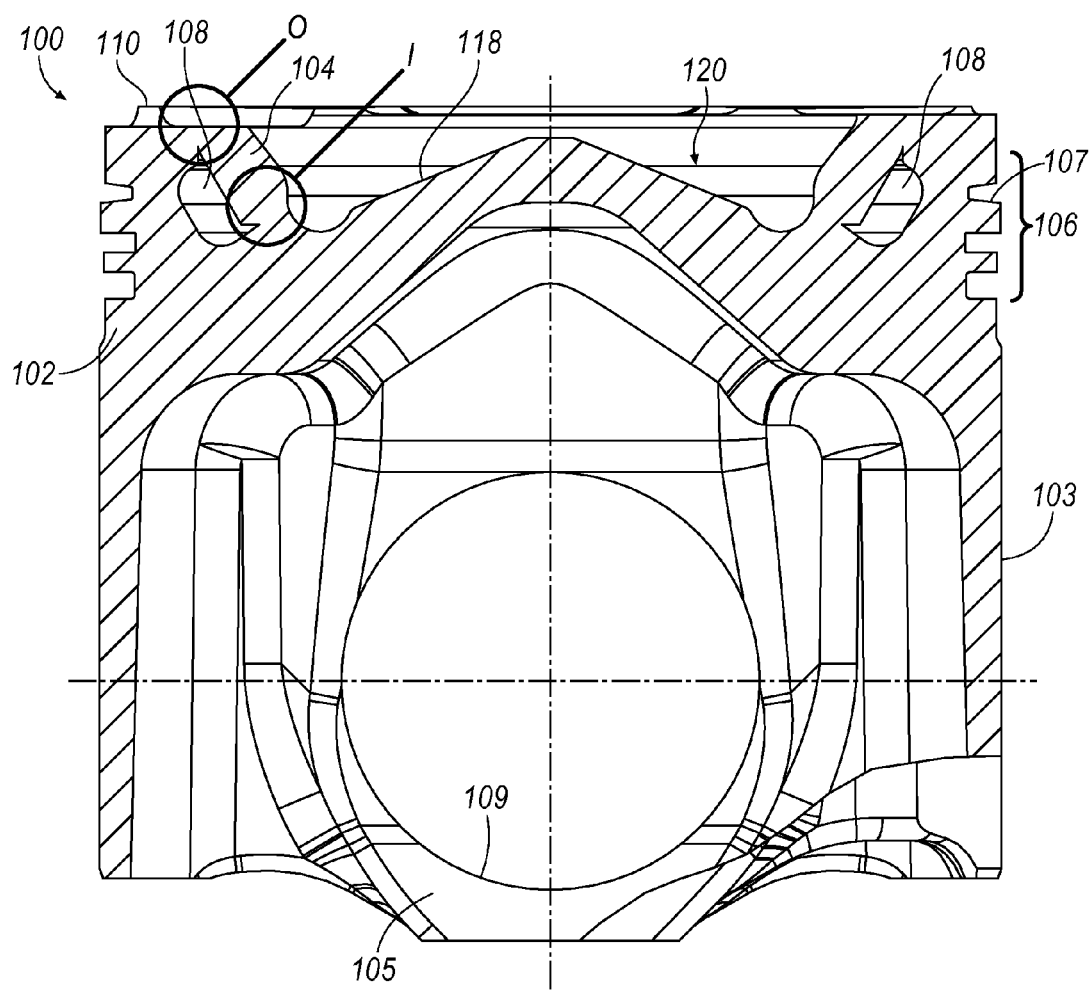
FIG. 1B is a partial section view of the exemplary piston assembly of FIG. 1A, taken at 90 degrees relative to the section illustrated in FIG. 1A.

Turning now to FIGS. 1A and 1B, an exemplary piston assembly 100 is illustrated. Piston assembly 100 may include a piston body 102 and an annular ring 104 that is joined with the body 102. The piston body 102 and annular ring 104 may thereby define a combustion bowl 120 having a combustion bowl lower surface 118. The body 102 may include a ring belt portion 106 that is configured to seal against an engine bore (not shown) receiving the piston assembly 100. For example, the ring belt portion 106 may define one or more circumferential grooves 107 that receive piston rings (not shown), which in turn seal against engine bore surfaces during reciprocal motion of the piston assembly 100 within the engine bore. Receipt of the annular ring 104 within the body 102 may allow flexibility in regard to the size and shape of the annular ring 104 and/or the piston assembly 100, e.g., allowing a lower overall compression height and/or center of gravity of the piston assembly 100.

The piston body 102 may include a skirt surface 103 that generally supports the piston assembly 100 during engine operation, e.g., by interfacing with surfaces of an engine bore (not shown) to stabilize the piston assembly 100 during reciprocal motion within the bore. For example, the skirt surface 103 may generally define a circular outer shape about at least a portion of a perimeter of the piston assembly 100. The outer shape may correspond to the engine bore surfaces, which may be generally cylindrical.

The body 102 may also define piston pin bosses 105. The piston pin bosses 105 may generally be formed with apertures or pin bores 109 configured to receive a piston pin (not shown). For example, a piston pin may be inserted through the pin bores 109 in the piston pin bosses 105, thereby generally securing the piston 100 to a contacting rod (not shown).

The piston body 102 and annular ring 104 may cooperate to define an annular space or gap 108. The annular gap 108 generally extends about a perimeter of the piston crown, and provides a thermal break between the upper portions of the piston 100, e.g., annular ring 104, and lower portions of the piston 100, e.g., the body 102. The annular gap 108 generally comprises an empty space between the annular ring 104 and the body 102. During operation of an engine using the piston 100, the gap 108 forms a thermal break which inhibits or prevents conductive heat transfer from the ring 104 to the body 102 through the gap 108. By contrast, previous approaches employing cooling galleries emphasize conduction of heat circulation of a liquid coolant through a cooling gallery in order to increase conduction of heat through the piston and away from an associated combustion chamber. As convective heat transfer is much lower than conductive heat transfer, the annular gap 108 serves as a thermal break between the ring 104 and the body 102. As illustrated in FIG. 1A, the annular gap 108 may define a thickness $T_1$ in a direction perpendicular to the orientation of the annular ring 104. In one exemplary illustration, the thickness $T_1$ is approximately 10 millimeters (mm).

The piston body 102 also defines an annular gap vent 130, which allows for communication of the interior of the annular gap 108 with the external atmosphere. This may be particularly beneficial during a welding process associated with the ring 104 and body 102, by allowing gases heated as a result of the welding process to escape the annular gap 108. The vent 130 may be positioned without limitation anywhere on the piston 100, since the vent 130 is not used for any purpose during engine operation, as the annular gap 108 is kept empty. Moreover, exemplary vents 130 may have any size that is convenient. By contrast, pistons having cooling galleries typically require precise location and sizing of inlets and outlets in order to allow entry of engine coolant into and out of the cooling gallery, and the inlets of cooling galleries must generally be aligned with cooling jets in order to maximize the amount of coolant that reaches the gallery.

Figure 2A:
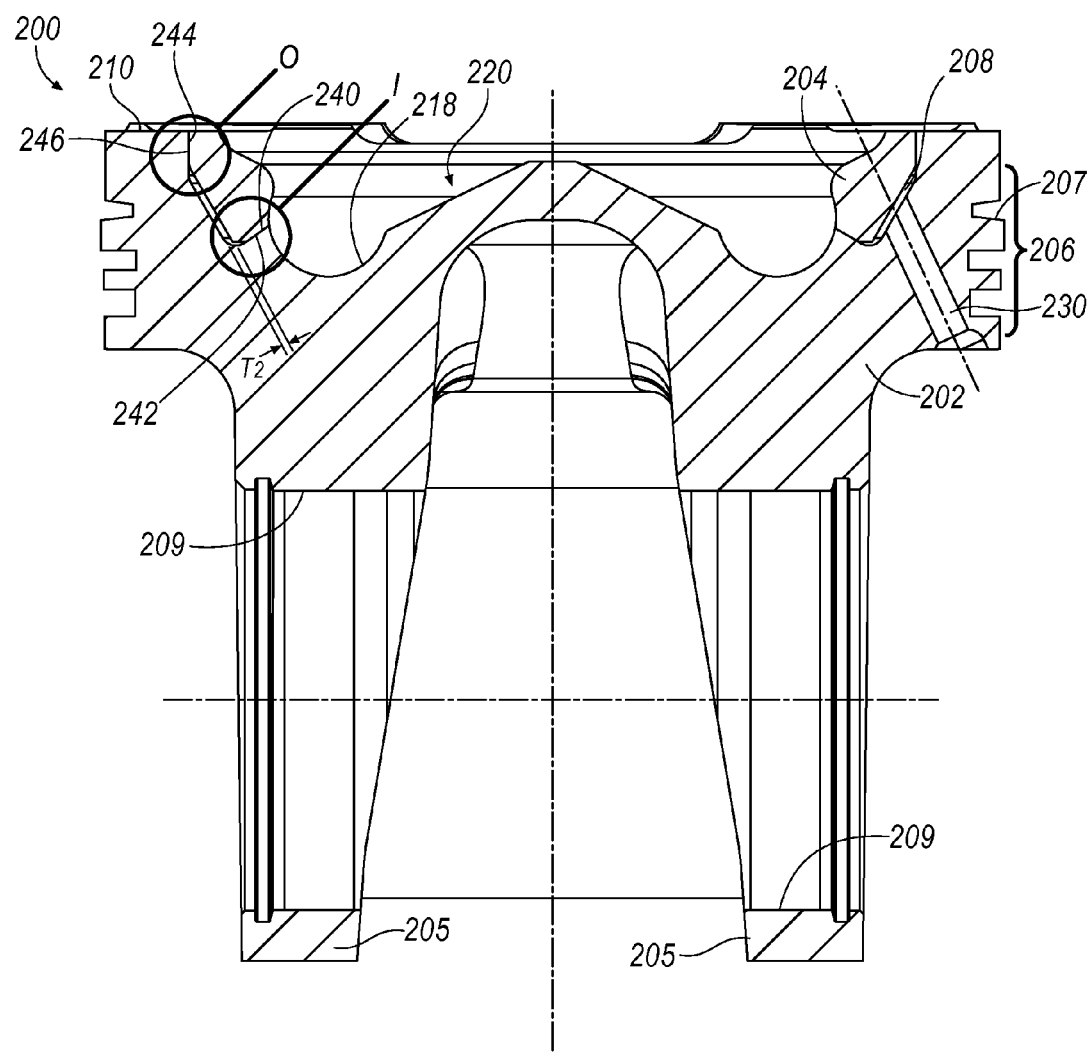
FIG. 2A is a partial section view of another exemplary piston assembly.
Figure 2B:
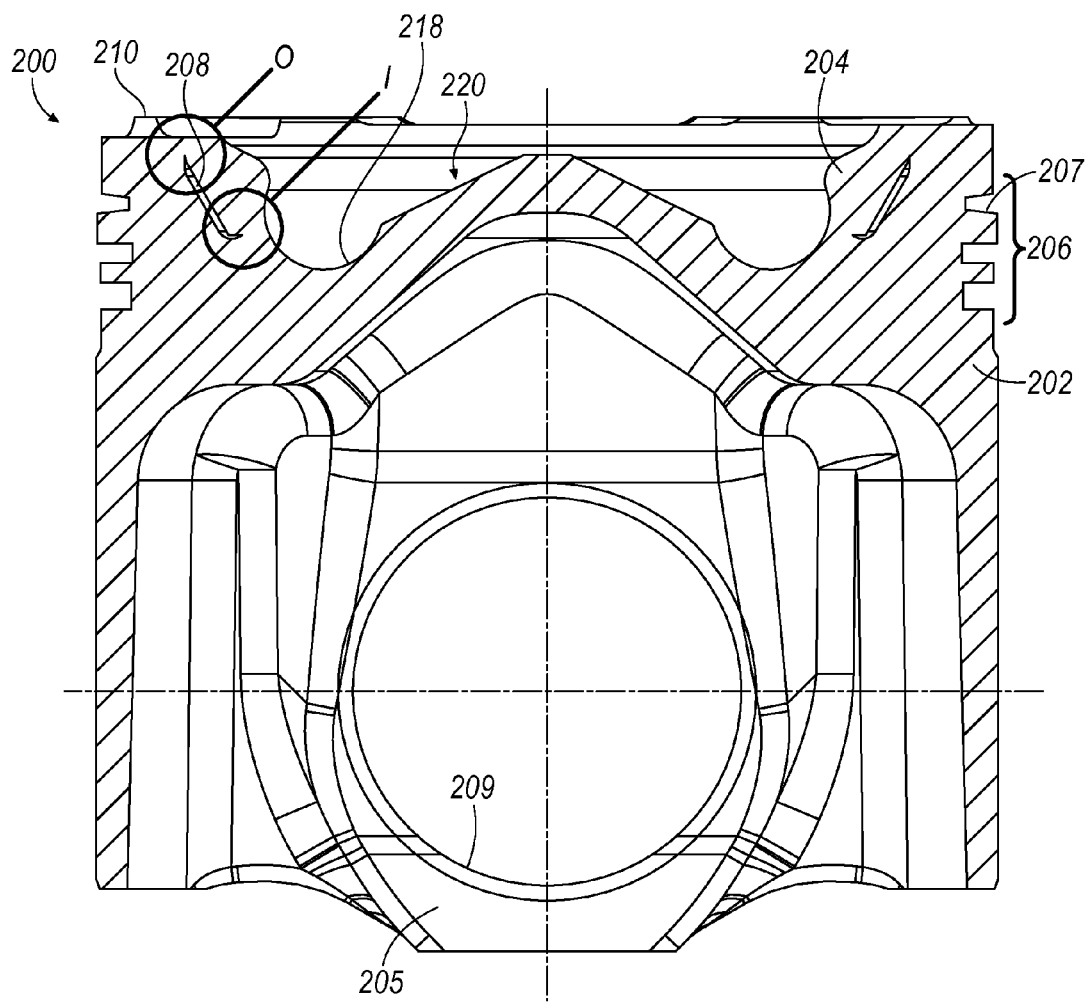
FIG. 2B is a partial section view of the exemplary piston assembly of FIG. 2A, taken at 90 degrees relative to the section illustrated in FIG. 2A.

Turning now to FIGS. 2A and 2B, another exemplary piston 200 is illustrated. As with piston 100, the piston 200 may include a piston body 202 and an annular ring 204 that is joined with the body 202. The piston body 202 and annular ring 204 may thereby define a combustion bowl 220 having a combustion bowl lower surface 218. Additionally, the body 202 may include a ring belt portion 206 that is configured to seal against an engine bore (not shown) receiving the piston assembly 200, e.g., via piston rings (not shown) received within annular ring grooves 107.

The piston body 202 includes a skirt surface 203 generally supporting the piston assembly 200 during engine operation, e.g., by interfacing with surfaces of an engine bore (not shown) to stabilize the piston assembly 200 during reciprocal motion within the bore. For example, the skirt surface 203 may generally define a circular outer shape about at least a portion of a perimeter of the piston assembly 200. The outer shape may correspond to the engine bore surfaces, which may be generally cylindrical.

The body 202 may also define piston pin bosses 205. The piston pin bosses 205 may generally be formed with apertures or pin bores 209 configured to receive a piston pin (not shown). For example, a piston pin may be inserted through the pin bores 209 in the piston pin bosses 205, thereby generally securing the piston 100 to a contacting rod (not shown).

The piston body 202 and annular ring 204 may cooperate to define an annular space or gap 208. As with annular gap 108 of the piston 100, the annular gap 208 generally extends about a perimeter of the upper portion or crown area of the piston 200, and provides a thermal break between the upper portions of the piston 200, e.g., annular ring 204, and lower portions of the piston 200, e.g., the body 202. The annular gap 208 generally comprises an empty space between the annular ring 204 and the body 202, which forms a thermal break inhibiting or preventing conductive heat transfer from the ring 204 to the body 202 through the gap 208. As such the gap 208 serves as a thermal break between the ring 204 and body 202 by limiting heat transfer through the gap 208 to convective heat transfer, thereby reducing the overall amount of heat transfer from the ring 204 to the body 202 that can occur through the gap 208. As illustrated in FIG. 2A, the annular gap 208 may define a thickness $T_2$ in a direction perpendicular to the orientation of the annular ring 104. The annular gap 208 is relatively thin by comparison to the annular gap 108. In one exemplary illustration, the thickness $T_2$ is approximately 1 millimeter (mm). Additionally, as shown in FIGS. 2A and 2B, the gap 208 when viewed in section defines an angled, relatively thin cross sectional area that is elongated. The relatively thinner gap 208 may generally facilitate greater overall stiffness of the piston 200 in comparison to piston 100, but may in turn sacrifice some measure of thermal insulation as a result of the relatively smaller annular gap 208. The relatively thinner gap 208 may also facilitate a smaller overall height/size of the piston, which may be advantageous in some applications.

The piston body 202 also defines an annular gap vent 230, which allows for communication of the interior of the annular gap 208 with the external atmosphere. This may be particularly beneficial during a welding process associated with the ring 204 and body 202, by allowing gases heated as a result of the welding process to escape the annular gap 208. The vent 230 may be positioned without limitation on the piston 200, since the vent 230 is not used for any purpose during engine operation, as the annular gap 208 is kept empty. By contrast, pistons having cooling galleries typically require precise location of inlets and outlets in order to allow entry of engine coolant into and out of the piston.

As the annular gaps 108, 208 are not used to circulate coolant, and instead are kept substantially empty during operation, certain design difficulties may be avoided for examples where laser welding is employed. For example, weld spatter may be a risk in most laser welding applications, and must be carefully managed during the welding process and subsequently removed. Otherwise, coolant circulated through a cooling gallery might loosen the weld spatter, circulating it through the piston and/or engine, and causing damage to both. By contrast, since no coolant is circulated through the annular gaps 108, 208 during operation, the presence of weld spatter is of comparably little consequence, and in any case does not pose the dangers described above for pistons having cooling galleries. As a result, exemplary laser welding processes need not be as carefully controlled or managed. Moreover, in some cases a laser weld joint penetration may be increased to a full penetration of the weld joint, i.e., such that an entire length of the mating surfaces of the ring 104, 204 and body 102, 202 are welded together. Such a full penetration was not previously acceptable for cooling gallery interior joints, since such full penetration generates significant weld spatter.

The piston bodies 102, 202 and annular rings 104, 204 may be fixedly joined, e.g., in a laser welding process. By fixedly joining the piston bodies 102, 202 and rings 104, 204, the pistons 100, 200 may be generally formed as a one-piece assembly.

As will be described further below, in each of the pistons 100, 200, the bodies 102, 202 and rings 104, 204 may be joined along both a radially inner interface region I, and a radially outer interface region O, in a laser welding process. Accordingly, the piston bodies 102, 202 may be generally unitized with their respective annular rings 104, 204, such that each is immovable relative to the other after securement to the crown, although the bodies 102, 202 and rings 104, 204 are separate components. The annular rings 104, 204 may be secured to the bodies 102, 202 such that the bodies 102, 202 and the rings 104, 204 cooperate to form a continuous upper combustion bowl surface 120, 220 of the pistons 100, 200, respectively.

In some exemplary illustrations, pistons may be joined in a welding process, e.g., a laser welding process. Exemplary laser welding processes, as will be described further below, may facilitate substantial gains in manufacturing flexibility. Pistons 100, 200 may, in some exemplary approaches, have at least one set of the radially inner and outer mating surfaces aligned non-perpendicular to the piston axis. For example, a generally vertical weld joint is possible, i.e., where the corresponding mating surfaces of two piston components being joined are aligned generally parallel to a longitudinal axis of the piston, e.g., as shown in the radially outer interface region O of the pistons 100, 200. Additionally, corresponding mating surfaces of the pistons 100, 200 in the radially inner interface region I may define an oblique angle with respect to a longitudinal axis of the pistons 100, 200, in order to advantageously align the mating surfaces with an impinging laser beam used to weld the mating surfaces together. Nevertheless, horizontal mating surfaces may also be employed, e.g., where a weld joint between the ring and body of the pistons 100, 200 is positioned along the ringland 106, 206. Accordingly, abutting surfaces of a laser welded joint may define virtually any angle so long as the joint is accessible by an impinging laser welding beam. An elongated weld joint may generally result from, in one exemplary illustration, a laser welding process where a laser beam is impinged generally parallel to corresponding mating surfaces of a piston body and a cooling gallery ring.

Referring now to FIGS. 1A and 1B, corresponding radially outer mating surfaces 144, 146 of the body 102 and ring 104, respectively, may meet along the upper surface 110 in a radially outer interface region O of the piston 100. In this manner, the radially outer joint between the body 102 and ring 104 is positioned directly adjacent the upper surface 110. In other exemplary illustrations, a radially outer joint between a piston body and annular ring may be positioned along the ringland 106. In such examples (not shown), the mating surfaces between the body and ring may be aligned generally horizontally or generally perpendicular the a longitudinal axis of the piston.

Corresponding radially inner mating surfaces 140, 142 of the body 102 and ring 104, respectively, may meet within the combustion bowl 120 along the radially inner interface region I such that the annular ring 104 defines a first radially outer portion of the combustion bowl 120. Further, the body 102 may define a radially inner portion of the combustion bowl surface 120 that is disposed radially inwardly of the radially inner interface region I.

Similarly, referring now to FIGS. 2A and 2B, corresponding radially outer mating surfaces 244, 246 of the body 202 and ring 204, respectively, may meet along the upper surface 210 in a radially outer interface region O of the piston 200. Additionally, corresponding radially inner mating surfaces 240, 242 of the body 202 and ring 204, respectively, may meet within the combustion bowl 220 along the radially inner interface region I such that the annular ring 204 defines a first radially outer portion of the combustion bowl 220. Further, the body 202 may define a radially inner portion of the combustion bowl surface 220 that is disposed radially inwardly of the radially inner interface region I.

The combustion bowl surfaces 120, 220 may be substantially smooth across at least one of the interfaces between the rings 104, 204 and their respective bodies 102, 202, e.g., the radially inner interface region I and/or radially inner interface region O. Disruptions and/or discontinuities in the surface 120, 220 may thereby be minimized. Minimizing such disruptions or discontinuities may generally reduce cracks or other loosening of an interface between the body 102, 202 and the ring 104, 204 along the interface regions I, O during normal long-term operation. Accordingly, any defects or failure in the combustion bowl surface 120, 220, e.g., due to wear occurring during operation of an engine using piston assembly 100, 200, may be minimized. As will be described further below, welding and/or machining operations used in the formation of piston assembly 100, 200 may reduce surface irregularities in the combustion bowl surface 120, 220.

The piston body 102, 202 and the annular ring 104, 204 may be secured or fixedly joined to one another in a welding operation such as laser welding. In one exemplary illustration, the piston body 102, 202 and annular ring 104, 204 are secured to one another along both the radially inner and outer interface regions I, O. A laser weld may allow the weld tool to form a generally smooth combustion bowl surface 120, 220 requiring at most minimal machining operations before and/or after a welding process associated with joining the body 102, 202 and the annular ring 104, 204. Moreover, in some examples no machining at all may be necessary.

As noted above, the radially inner interface region I may be positioned along the combustion bowl surface 120, 220. The radially outer interface region O may be positioned along an upper surface 110, 210 of the pistons 100, 200. The positioning of the radially outer interface region O in the upper surface 110, 210 may advantageously allow the body 102, 202, e.g., along the piston ring belt portion 106, 206, to support the annular ring 104, 204, especially when the piston 100, 200 is installed within a corresponding bore (not shown). The additional support of the annular ring 104, 204 in this manner may thereby increase durability of the piston 100, 200 and resistance to high temperature and pressure.

A laser beam associated with a laser welding operation of the interface regions I, O may be directed generally or substantially parallel to mating surfaces of the body 102 and ring 104 in the interface regions I, O. In one exemplary illustration, a laser beam employed in a laser welding process is angled with respect to the piston axis of the pistons 100, 200. For example, a laser beam may be directed at an oblique angle (i.e., parallel to the mating surfaces 140, 142 and 240, 242) with respect to the piston axis when directed to welding interface region I.

In another exemplary illustration, a laser beam may be directed substantially parallel to piston axis when directed to welding interface region O, along the upper surfaces 110, 210 of the piston 100, 200. Moreover, the laser beam may be substantially parallel to mating surfaces 144, 146 and 244, 246 between the body 102, 202 and ring 104, 204, respectively, along the interface region O.

The piston body 102, 202 and annular ring 104, 204 may be constructed from any materials that are convenient. In examples where the body and ring are laser welded together, the materials of each may be susceptible to being laser welded. Merely by way of example, any metallic containing compounds that are receptive to being laser welded may be employed. In one exemplary illustration, the body 102 and annular ring 104 are formed of different materials. In some exemplary approaches, a difference in thermal conductivity between different materials used in the ring 104, 204 and the body 102, 202 may be used to further increase a thermal break effect provided by the annular gap 108, 208. In one example, an Inconel material, e.g., Inconel 625, is employed for the ring 104, 204, while a steel material is employed for the body 102, 202. Inconel may be particularly advantageous as it is highly resistant to oxidation. In one example, the ring 104, 204 is formed of an Inconel material, while the body 102, 202 is formed of a steel material, and thus the ring 104, 204 may have a comparatively higher resistance to oxidation and also a lower thermal conductivity than the body 102, 202. Accordingly, a material used for the components may be more closely matched with the general requirements and operating conditions relevant to each. Piston body 102 may, merely as examples, include different mechanical properties, e.g., yield point, tensile strength or notch toughness, than the annular ring 104. Any material or combination may be employed for the body 102 and annular ring 104 that is convenient. Merely as examples, the body 102 and/or annular ring 104 may be formed of a steel material, cast iron, aluminum material, composite, or powdered metal material. Additionally, any forming processes that are convenient may be used for the body 102, 202 and annular ring 104, 204. For example, the body 102, 202 and annular ring 104,204 may each be formed using a forging process, e.g., where body the body 102, 202 and annular ring 104, 204 are formed of a steel material. Alternatively, the body 102, 202 and annular ring 104,204 may be formed in different processes, e.g., machining, casting, etc. Any material and/or forming combination may be employed that is convenient.

Although steel materials having generally high carbon equivalent values have been traditionally ill-suited for welding in general, in one exemplary illustration a relatively high-carbon equivalent value steel is used for at least one of the body 102 and annular ring 104. For example, a steel having a carbon content of 0.38%, e.g., 38MnVS6 or a carbon content of 0.42%, e.g., 42 CrMo4, may be employed. Carbon equivalent values may be somewhat higher than actual carbon content on a percentage by weight basis.

The ring 104, 204 due in part to its location at the radially outer region of the combustion bowl 120, 220, may in particular require resistance to high temperatures and pressures, and may have a lower thermal conductivity than the body 102, 202. Accordingly, heat-resistant material, such as Inconel, may be employed, as noted above. The ring 104, 204 may also require a higher corrosion and/or oxidation resistance than the body 102, 202. As noted above, in this respect an Inconel material, e.g., Inconel 625, may be well suited as it is highly resistant to oxidation. In another exemplary illustration, a material employed for the ring 104, 204 has a relatively low sulfur content. A low sulfur content may result in a more consistent and higher-quality weld along both the inner and outer interface regions I, O.

In another exemplary illustration, a higher nickel content in at least one of the body 102, 202 and ring 104, 204 may improve weld quality. Moreover, in some examples a nickel-based material may be added, e.g., a nickel-iron as a filler material, during the welding process to promote a higher quality weld.

One or more coatings may also be applied to the pistons 100, 200. For example, coatings configured to increase thermal efficiency of the piston 100, 200, e.g., by reducing friction, may be applied. In one example, a graphite-impregnated resin coating, such as GRAFAL®, may be applied to the skirt support surface 103, 203. Additionally, phosphate coatings such as manganese phosphate may be applied to the piston to reduce friction, e.g., around the piston pin bores.

Any variety of laser welding systems may be employed as part of an exemplary laser welding process. For example, a solid state, disk, carbon-dioxide, or fiber laser may be employed. Carbon-dioxide laser systems are well known and may therefore be more familiar in mass manufacturing settings than, for example, more recently developed fiber laser systems. However, a carbon-dioxide laser process also typically requires a large machine that cannot be easily moved, e.g., around a manufacturing facility, whereas a solid state laser may be employed anywhere a fiber or light-transmitting medium can be extended.

Typically, a thicker weld joint may require a greater power laser to properly melt the materials being joined. A laser welding process may cause some degree of weld spatter beyond the interface regions I, O, and in particular within the annular gap 108, 208. However, as described above weld spatter may not be a disadvantage as with pistons employing cooling galleries, since no coolant is ever circulated through the annular gap 108, 208. Accordingly, weld power may be increased to allow full penetration of one or more weld joints associated with the pistons 100, 200.

The exemplary pistons 100 disclosed herein may be employed in small and large bore diameter applications, generally without limitation. Additionally, the pistons 100, 200 may be used in any fuel application that is convenient, including diesel, natural gas, gasoline, ethanol, and oil fuel applications typical of heavy duty marine applications. Generally, there is no performance deficiency in terms of peak combustion pressures that the exemplary pistons 100, 200 may generally withstand in comparison to pistons having cooling galleries. In one exemplary illustration, exemplary pistons 100, 200 may withstand peak combustion pressures of over 300 Bar. Ultimately, one failure mechanism which may generally limit use of exemplary pistons 100, 200 having annular gaps 108, 208 may be along the top piston ring. More specifically, an uppermost piston ring positioned in the piston ring groove nearest the combustion chamber may tend to scuff as heat exposure exceeds the capability of the annular gaps 108, 208 to prevent heat transfer to the outer ringland area 106. Additionally, the larger ringland area of the pistons 100, 200, i.e., positioned between the uppermost and second ring groove, may similarly scuff when applicable limits are exceeded.

The piston assembly 100 may tolerate increased peak combustion temperatures as a result of the thermal break provided by the annular gap 108, 208, rigidity of the piston 100, 200, and the additional flexibility in material selection discussed above. Additionally, the exemplary pistons 100, 200 may facilitate reduced Manufacturing costs may also be reduced due to the simplified forging and welding processes that may be used in some exemplary illustrations.

Figure 3:
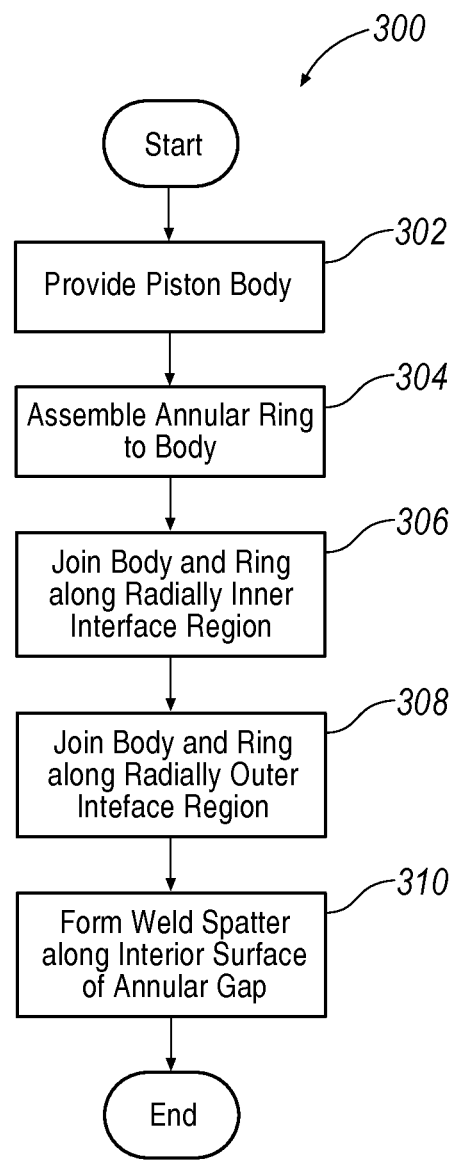
FIG. 3 illustrates a process flow diagram for an exemplary method.

Proceeding to FIG. 3, an exemplary process 300 for assembling a piston, e.g., piston 100, is illustrated. Process 300 may being at block 302, where a piston body is provided. For example, as described above a piston body 102, 202 may be formed, e.g., in a casting or forging process. Moreover the piston body 102, 202 may include radially inner and outer mating surfaces 140, 144 or 240, 244.

Proceeding to block 304, an annular ring may be assembled to the body. For example, as described above an annular ring 104 may be formed, e.g., in a casting or forging process, and may include radially inner and outer mating surfaces 142, 146 or 242, 246 that correspond to those of the piston body 102, 202. The ring 104, 204 may be assembled to the body 102, 202 in a manner to facilitate secure positioning of the ring 104, 204 relative to the body 102, 202, without permanently securing the two components together. For example, a shrink fit or relatively small mechanical fastening may be used to position the ring 104, 204 relative to the body 102, 202 prior to the permanent joining of the components, e.g., by laser welding. Additionally, as noted above, in some examples the ring 104, 204 may be formed of a different material as the body 102, 202. Process 300 may then proceed to block 306.

At block 306, the body 102, 202 may be joined to ring 104, 204 along a radially inner interface region. For example, as noted above in some exemplary approaches a laser weld may be employed to join corresponding mating surfaces of the ring 104, 204 and body 102, 202, e.g., mating surfaces 142, 140 and 242, 240, respectively. Moreover, the mating surfaces may be elongated in a direction generally parallel to the impingement of a laser. The laser itself may result in a relatively narrow weld and/or heat affected zone. For example, a weld encompassing mating surfaces of the ring 104, 204 and body 102, 202 may be elongated such that it has a width in a direction generally perpendicular to the mating surfaces 140, 142 and 240, 242 that is smaller than a height, i.e., a length of the mating surfaces 140, 142 and 240, 242 in a direction parallel to the impingement of the laser beam.

Proceeding to block 308, the body may be joined to the ring along a radially outer interface region. As with the radially inner interface region, mating surfaces of the ring 104, 204 and body 102, 202 may be aligned generally parallel to an impinging laser beam. Moreover, as described above mating surfaces 144, 146 and 244, 246 of the body 102, 202 and ring 104, 204, respectively, may be oriented generally vertically, i.e., in a direction generally parallel to a piston axis.

In one or both of the blocks 308 and 310, a weld joint may be fully penetrated by a laser beam, as described above. In one exemplary approach, an entire length of a pair of mating surfaces is melted as a result of the laser welding process. Process 300 may then proceed to block 310.

Proceeding to block 310, weld spatter may be formed along at least one interior surface of the annular gap 108, 208 formed by the ring 104 and body 102. As noted above, weld spatter need not be subsequently removed, as the piston 100, 200 is generally operated without circulating liquid coolant through the annular gap 108, 208. Rather, the annular gap 108, 208 may generally be empty or otherwise filled with atmospheric air within the engine, thereby providing a thermal break between the combustion chamber and the piston body 102, 202 that substantially prevents heat transfer across the annular gap 108, 208.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   providing a piston having a piston body defining a piston axis, the piston body including radially inner and outer body mating surfaces;
   assembling an annular ring with the piston body such that the piston body and the annular ring cooperate to form a continuous upper combustion bowl surface having a radially inner portion defined by the piston body and a radially outer portion defined by the annular ring, the annular ring including a radially inner ring mating surface and a radially outer ring mating surface;
   joining the body to the annular ring along at least one of the radially inner and outer mating surfaces of the body and the annular ring;
   wherein the annular ring and piston body cooperate to define an annular gap therebetween that is left empty or includes air therein during an operation of the piston, forming a thermal break between the combustion bowl and the piston body, the annular gap positioned to thermally insulate the piston body from the annular ring during the operation of the piston; and
   wherein the annular gap has a thickness of approximately 1 mm.

2. The method of claim 1, further comprising establishing the joining of the body to the annular ring along the at least one of the radially inner and outer mating surfaces of the body and the annular ring as including laser welding.

3. The method of claim 1, wherein the piston body includes a skirt configured to interface with an engine bore surface.

4. The method of claim 1, further comprising forming a weld spatter on a surface, the surface at least partially defining the annular gap.

5. The method of claim 1, further comprising fully penetrating a weld joint including an entire length of the at least one of the radially inner and outer mating surfaces of the body and the annular ring.

6. The method of claim 1, further comprising establishing a primary path of heat transfer across the annular gap during operation of an engine into which the piston is installed as convection.

7. The method of claim 1, further comprising establishing the ring as being formed from a first material and the body being formed from a second material; wherein the first material has a higher oxidation resistance than the second material.

8. The method of claim 1, wherein the piston body includes an annular gap vent that allows for communication of an interior of the annular gap with an external atmosphere during the operation of the piston.

9. A method, comprising:
providing a piston having a piston body that defines a piston axis, the piston body including radially inner and outer body mating surfaces;
assembling an annular ring with the piston body such that the piston body and the annular ring cooperate to form a continuous upper combustion bowl surface having a radially inner portion defined by the piston body and a radially outer portion defined by the annular ring, the annular ring including a radially inner ring mating surface and a radially outer ring mating surface;
joining the body to the annular ring along at least one of the radially inner and outer mating surfaces of the body and the annular ring;
wherein the annular ring and piston body enclose an annular gap, the annular gap having air therein during an engine operation, the annular gap positioned to thermally insulate the piston body from the annular ring during the operation of the engine into which the piston is installed; and
wherein the annular gap has a thickness of approximately 1 mm, and the piston body includes an annular gap vent that allows for communication of an interior of the annular gap with an external atmosphere during the operation of the engine.

10. The method of claim 9, further comprising operating an engine with the piston.

11. The method of claim 9, further comprising establishing the joining of the body to the annular ring along the at least one of the radially inner and outer mating surfaces of the body and the annular ring as including laser welding.

12. The method of claim 9, further comprising forming a weld spatter on a surface, the surface at least partially defining the annular gap.

13. The method of claim 9, further comprising fully penetrating a weld joint including an entire length of the at least one of the radially inner and outer mating surfaces of the body and the annular ring.

14. The method of claim 9, further comprising establishing the ring as being formed from a first material and the body being formed from a second material; wherein the first material has a higher oxidation resistance than the second material.

15. A piston, comprising:
a piston body defining a piston axis, the body including radially inner and outer body mating surfaces;
an annular ring cooperating with the piston body to form a continuous upper combustion bowl surface having a radially inner portion defined by the piston body and a radially outer portion defined by the annular ring, the annular ring including a radially inner ring mating surface and a radially outer ring mating surface, wherein the annular ring mating surfaces are joined with corresponding piston body mating surfaces; and
wherein the annular ring and piston body define an annular gap therebetween that is left empty or includes air therein during an operation of the piston in an engine, the annular gap configured to thermally insulate the piston body from the annular ring; and
wherein the annular gap has a thickness of approximately 1 mm.

16. The piston of claim 15, wherein the piston body includes a skirt configured to interface with an engine bore surface.

17. The piston of claim 15, wherein the piston body includes an annular gap vent that allows for communication of an interior of the annular gap with an external atmosphere during the operation of the piston in the engine.

* * * * *